April 6, 1943.        V. F. LUCHT        2,315,531

FLUID BRAKE

Filed Nov. 29, 1940

INVENTOR
Victor F. Lucht
BY
ATTORNEYS

Patented Apr. 6, 1943

2,315,531

UNITED STATES PATENT OFFICE 2,315,531

FLUID BRAKE

Victor F. Lucht, Washington, D. C.

Application November 29, 1940, Serial No. 367,768

7 Claims. (Cl. 188—96)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a fluid brake for guns and the like.

The purpose of the invention is to provide a simple fluid brake in which a piston having a short stroke for checking recoil and counterrecoil of a moving member functions through a valve which also serves as a buffer.

The specific nature of the invention as well as other objects and advantages thereof will clearly appear from a description of a preferred embodiment as shown in the accompanying drawing in which.

Figure 1:
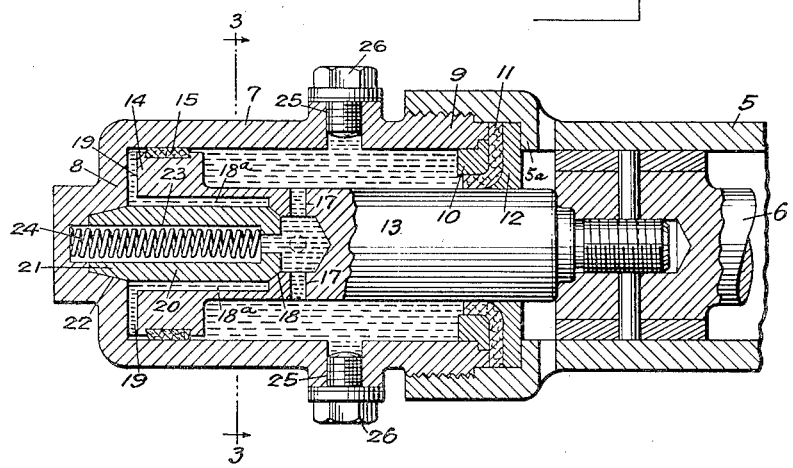
Fig. 1 is a longitudinal sectional view of the improved brake with the parts in normal position.

Referring to the drawing by characters of reference there is shown a fixed tubular support 5 which slidably receives an end of a rod 6 which may be associated with a short recoil gun such as disclosed in copending application, Serial No. 367,767, filed Nov. 29, 1940. In the application a rod is associated with means in the form of a block of rubber which serves to limit the recoil of the gun and restore it to battery. The rod 6 of this application and rod 30 of my other mentioned application may be considered to be the same element in a determination of the position of the instant fluid brake in a gun mount.

The brake forming the subject of this invention may be ancillary to the rubber recoil check shown in my above mentioned copending application and comprises a short cylinder 7 having a closed end 8 and an open end 9 threaded into the support 5. The inner end of the cylinder confines a metallic ring 10 which presses a fibrous packing 11 against a metallic ring 12 seated on a shoulder 5a of the support. The ring 10 is of greater internal diameter than the ring 12 to receive the turned in inner portion of the packing 11.

A piston rod 13 fixed to the rod 6 in any convenient manner is embraced by the packing 11 and ring 12 to prevent leakage of a fluid contained in the cylinder. The piston rod is spaced from the cylinder to provide a chamber for the fluid and at its front end it is provided with a piston head 14 having a packing ring 15 engaging the wall of the cylinder.

An axial passage 16 extends from the front face of the piston head to a short distance in rear of the head where it communicates with radial ports 17 in the piston rod. The wall of the passage 16 includes a conical valve seat 18 directly in front of the radial ports 17. The wall of the passage 16 is also formed with a plurality of annularly spaced longitudinal grooves 18a extending from the valve seat to the front face of the piston head where they communicate with radial grooves 19 formed in the front face.

A cylindrical valve 20 slidably mounted in the axial passage 16 has its rear end formed with a beveled edge for engaging the valve seat 18. The valve, when thus seated, has a projecting tapered front end 21 which is adapted to enter a correspondingly shaped recess or valve seat 22 in the closed end 8 of the cylinder when the piston head is at the limit of its forward movement against the end 8.

The valve 20 is formed with an axial passage 23 for establishing fluid communication between that portion of the passage 16 which is in rear of the valve seat and the chamber in front of the piston head. A helical spring 24 housed in the passage 23 and confined between the closed end 8 of the cylinder and the front portion of the valve urges the valve to closed position on the seat 18.

The cylinder is provided with one or more filling apertures 25 for introducing a fluid and each aperture is threaded for a closing plug 26.

As shown in Fig. 1, with the gun and its associated rod 6 in the normal "in battery" position, the front face of the piston head 14 is in engagement with the closed end 8, the valve 20 is closed with the valve spring 24 compressed, the tapered front end 21 of the valve is seated in the recess or valve seat 22, and the system is filled with fluid.

Figure 2:
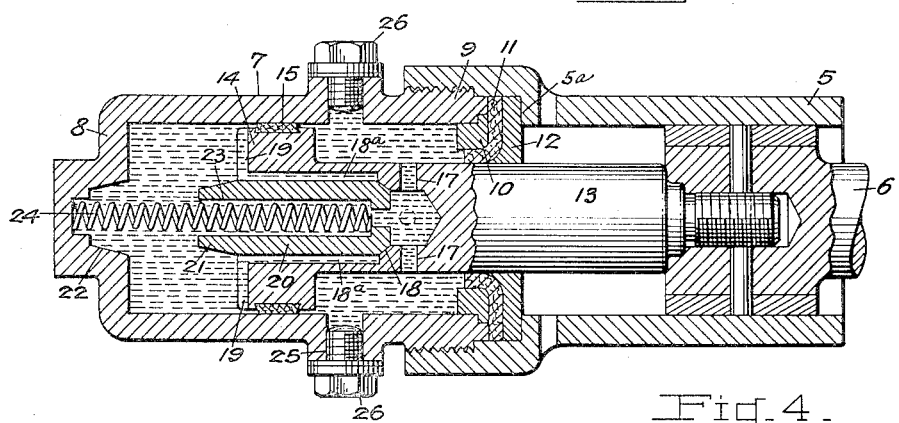
Fig. 2 is a similar view with the parts in position at the start of counterrecoil.
Figure 3:
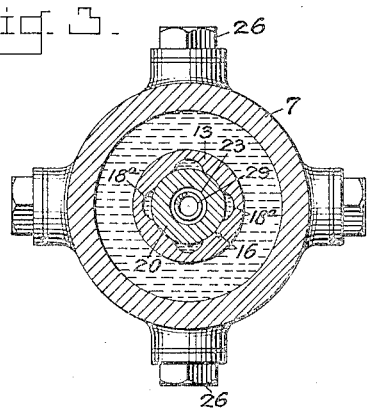
Fig. 3 is a sectional view on the line 3—3 of Fig. 1.
Figure 4:
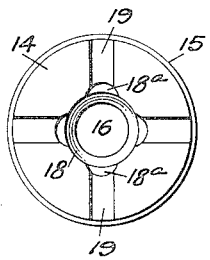
Fig. 4 is an end view of the piston head.

When the gun and rod 6 move in recoil the piston is retracted to the position shown in Fig. 2. During this movement the fluid in rear of the piston head is throttled through the passage 23 in the valve 20 and because of the pressure of the fluid the valve 20 is maintained in an open position throughout the recoil stroke. With the valve 20 open the fluid is also throttled through the grooves 18a in the piston.

When the gun is at the end of its recoil stroke, the valve 20 is closed by its spring, so that on the counter-recoil stroke the fluid is constrained to return through the axial passage 23 in the valve. At the termination of the counterrecoil stroke the tapered front end 21 of the valve enters the recess or valve seat 22 and restricts the flow of fluid into the axial passage 23 of the valve. This construction provides a buffer which insures the easing of the gun into battery.

I claim:

1. A fluid brake comprising a cylinder adapted to contain a fluid and having a front end with a tapered recess in its innerside, a piston rod working in the cylinder and including a piston head on its front end, said piston rod having an axial passage extending from its front face to a point in rear of the head and having a valve seat spaced from the rear end of said passage, throttling grooves in the wall of the passage in front of the valve seat, radial ports in the piston rod in rear of the valve seat and in the piston head, a tubular valve in the axial passage and having a tapered front end projecting forwardly of the piston head and adapted to fit in the tapered recess in the front end of the cylinder, and a spring between the cylinder and the valve.

2. A fluid brake comprising a cylinder adapted to contain a fluid and having a tapered recess in the inner end of one end wall, a piston rod and piston head in the cylinder and having a fluid passage leading to opposite sides of the piston head, a valve seat intermediate the ends of the fluid passage, throttling grooves in the wall of the fluid passage forwardly of the valve seat, a tubular valve in the fluid passage and having a tapered front end projecting forwardly of the piston head and adapted to fit in the tapered recess in the inner end of the end wall, and a spring between the valve and cylinder.

3. A fluid brake comprising a cylinder adapted to contain a fluid, a piston rod and piston head in the cylinder and having a fluid passage leading to opposite sides of the piston head, a valve seat intermediate the ends of the fluid passage, throttling grooves in the wall of the fluid passage forwardly of the valve seat, a tubular valve in the fluid passage, and a spring between the valve and cylinder.

4. A fluid brake comprising a cylinder adapted to contain a fluid and having a valve seat in the inner end of one end wall, a piston rod and piston head in the cylinder and having a fluid passage leading to opposite sides of the piston head, a second valve seat intermediate the ends of the fluid passage, a tubular valve filling a substantial portion of the fluid passage and having a front end projecting forwardly of the piston head and adapted to fit in the first mentioned valve seat in the inner end of the end wall, and a spring normally biasing the valve in engagement with said second valve seat.

5. A fluid brake comprising a cylinder adapted to contain a fluid and having a recess in the inner end of one end wall, said recess partaking of a valve seat, a piston and piston head in the cylinder and having a fluid passage leading to opposite sides of the piston head, a second valve seat intermediate the ends of the fluid passage, a valve filling a substantial portion of the fluid passage and having a front end projecting forwardly of the piston head and adapted to fit in the recess in the inner end of the end wall, a spring normally biasing the valve into engagement with said second valve seat, and said valve having a fluid passage therethrough.

6. A fluid brake comprising a cylinder adapted to contain a fluid and having a valve seat in the inner end of one end wall, a piston rod and piston head in the cylinder and having a passage leading to opposite sides of the piston head, a second valve seat intermediate the ends of the fluid passage, a valve filling a substantial portion of the fluid passage and having ends adapted to cooperate respectively with the first and second mentioned valve seats, and a spring normally biasing the valve into engagement with said second valve seat.

7. A fluid brake comprising a cylinder adapted to contain a fluid and having a valve seat in the inner end of one end wall, a piston rod and piston head in the cylinder and having a passage leading to opposite sides of the piston head, a second valve seat intermediate the ends of the fluid passage, a valve filling a substantial portion of the fluid passage, said valve having a fluid passage therethrough and having oppositely disposed ends adapted to cooperate respectively with the first and second mentioned valve seats, and a spring normally biasing the valve into engagement with said second valve seat.

VICTOR F. LUCHT.